(12) United States Patent
Waelde et al.

(10) Patent No.: US 12,288,926 B2
(45) Date of Patent: Apr. 29, 2025

(54) ANTENNA SYSTEM FOR A TOPOLOGY-CAPTURING RADAR METER

(71) Applicant: VEGA GRIESHABER KG, Wolfach (DE)

(72) Inventors: Steffen Waelde, Niedereschach (DE); Roland Welle, Hausach (DE); Levin Dieterle, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 178 days.

(21) Appl. No.: 18/001,646

(22) PCT Filed: Jun. 18, 2020

(86) PCT No.: PCT/EP2020/066939
§ 371 (c)(1),
(2) Date: Dec. 13, 2022

(87) PCT Pub. No.: WO2021/254624
PCT Pub. Date: Dec. 23, 2021

(65) Prior Publication Data
US 2023/0223704 A1    Jul. 13, 2023

(51) Int. Cl.
*H01Q 1/22* (2006.01)
*G01F 23/284* (2006.01)
(Continued)

(52) U.S. Cl.
CPC ........... *H01Q 1/225* (2013.01); *G01F 23/284* (2013.01); *G01S 13/89* (2013.01); *H01Q 5/40* (2015.01); *H01Q 21/061* (2013.01); *H01Q 21/28* (2013.01); *H01Q 13/02* (2013.01); *H01Q 19/08* (2013.01)

(58) Field of Classification Search
CPC .......... H01Q 1/225; H01Q 5/40; H01Q 13/02; H01Q 19/08; H01Q 21/061; H01Q 21/064; H01Q 21/28; G01S 7/2813; G01S 7/032; G01S 7/28; G01S 7/35; G01S 13/88; G01S 13/89; G01F 23/284; G01F 23/296
See application file for complete search history.

(56) References Cited

U.S. PATENT DOCUMENTS

| | | | |
|---|---|---|---|
| 10,337,903 | B2 | 7/2019 | Welle et al. |
| 11,067,427 | B2 | 7/2021 | Welle et al. |

(Continued)

FOREIGN PATENT DOCUMENTS

| | | |
|---|---|---|
| DE | 10 2018 112 819 A1 | 12/2019 |
| EP | 3 309 523 A1 | 4/2018 |

(Continued)

OTHER PUBLICATIONS

International Preliminary Report on Patentability and Written Opinion issued Dec. 29, 2022, in PCT/EP2020/066939, 10 pages.

(Continued)

*Primary Examiner* — Robert Karacsony
(74) *Attorney, Agent, or Firm* — Oblon, McClelland, Maier & Neustadt, L.L.P.

(57) ABSTRACT

A radar measuring device with an array antenna for topology detection and a level measurement antenna for fill level measurement. The array antenna is arranged around the level measurement antenna.

17 Claims, 9 Drawing Sheets

(51) Int. Cl.
  *G01S 13/89* (2006.01)
  *H01Q 5/40* (2015.01)
  *H01Q 21/06* (2006.01)
  *H01Q 21/28* (2006.01)
  *H01Q 13/02* (2006.01)
  *H01Q 19/08* (2006.01)

(56) References Cited

U.S. PATENT DOCUMENTS

2009/0178478 A1* 7/2009 Reimelt .................. H01Q 19/08
                                                                73/290 V
2018/0106602 A1* 4/2018 Welle .................... H01Q 21/205

FOREIGN PATENT DOCUMENTS

| EP | 2 803 952 B1 | 7/2019 |
|---|---|---|
| EP | 3 309 523 B1 | 3/2020 |
| EP | 3 377 864 B1 | 9/2020 |
| WO | WO 2020/049562 A1 | 3/2020 |

OTHER PUBLICATIONS

Search Report issued Sep. 10, 2021, in corresponding German Patent Application No. 10 2021 100 695.3 (with English Translation of Category of Cited Documents), 7 pages.

International Search Report mailed on Mar. 12, 2021 in PCT/EP2020/066939 filed on Jun. 18, 2020 (3 pages).

Sherif Sayed Ahmed et al. "Advanced Microwave Imaging", IEEE Microwave Magazine, IEEEService Center, Piscataway, NJ, US, vol. 13, No. 6, Sep. 1, 2012 (Sep. 1, 2012), pp. 26-43.

Xu Ding et al. "A Dielectric-Filled Waveguide Antenna Element for 3D Imaging Radar in High Temperature and Excessive Dust Conditions", Sensors, vol. 16, No. 8, Aug. 22, 2016 (Aug. 22, 2016), 14 pages.

* cited by examiner

ANTENNA SYSTEM FOR A TOPOLOGY-CAPTURING RADAR METER

FIELD OF INVENTION

The invention relates to the measurement of product surfaces. In particular, the invention relates to an antenna system configured for a radar measuring device detecting the topology of a product surface, a radar measuring device comprising such an antenna system, a method for measuring a topology of a product surface, a program element and a computer-readable medium.

TECHNICAL BACKGROUND

To detect the topology of a product surface, the product surface can be scanned with a measurement signal. Either the gauge or its antenna is mechanically swiveled for this purpose, or electronic beam control is used. It is also possible to mix the two. For electronic beam steering, an array of radiator elements is used in radar measuring devices. In this context, one also speaks of an array antenna.

The detected topology can then be used to calculate the fill level and the volume of the product.

The hardware effort for the electronic beam control cannot be neglected; the computing effort required for signal evaluation can also be considerable. For this reason, such measuring devices require a relatively large amount of energy.

However, energy is often a scarce resource, depending on the location and connection of the measuring device.

SUMMARY OF THE INVENTION

In view of this background, it is a task of the present invention to provide a radar measuring device, in particular a level radar measuring device, which manages with reduced hardware expenditure and reduced energy consumption.

This task is solved by the features of the independent patent claims. Further embodiments of the invention result from the dependent claims and the following description of embodiments.

A first aspect of the present disclosure relates to an antenna system configured for a radar measuring device detecting the topology of a product surface. In particular, the radar measuring device may be a level radar measuring device for process automation in an industrial environment. The antenna system has a first antenna configuration which is configured to detect the topology of the product surface. It also has a second, additional antenna configuration configured to detect the fill level. Different antenna configurations are therefore used for level measurement and for topology detection.

The first antenna configuration is an array antenna with an array of radiator elements arranged around the second antenna configuration.

For example, the second antenna configuration is a horn antenna.

The radiator elements of the first antenna configuration can also be (smaller) horn antennas. They could also be called horn radiators, and they can be filled with a dielectric. Also, they can be in the form of waveguide openings (filled or unfilled). Patch antennas, rod radiators or other antennas can also be used.

According to one embodiment, the diameter or edge length of the radiator elements of the first antenna configuration is (significantly) smaller than the diameter or edge length of the second antenna configuration.

According to a further embodiment, the radiating surfaces of the radiator elements of the first antenna configuration and the radiating surface of the second antenna configuration are arranged on the same plane. The "radiating surface" of the second antenna configuration is, for example, the aperture of the antenna horn. The radiating surface of the radiator elements of the first antenna configuration is, in the case of horn antennas, also the plane of the opening of the individual antenna horns. In the case of planar radiator elements (patch antennas), the radiating surfaces are formed by their surface.

According to a further embodiment, the radiating surfaces of the radiator elements of the first antenna configuration and/or the radiating surface of the second antenna configuration are holes in a metallic plate. The holes may be filled or unfilled with a dielectric. They may have a circular or angular cross-section.

For example, the metallic plate is round.

For example, the radiator elements of the first antenna configuration form a rectangle, hexagon, or other polygonal shape with sectional straight areas.

According to one embodiment, the radiator elements of the first antenna configuration comprise a (first) group of transmitting elements and a (second) group of receiving elements. Another aspect of the present disclosure relates to a radar measuring device, in particular a fill level radar measuring device, having an antenna system described above and in the following.

For example, the radar measuring device is configured to transmit an FMCW radar signal using the first antenna configuration and a pulse signal using the second antenna configuration.

The pulse signal can be, for example, a radar signal or an ultrasonic signal.

Another aspect of the present disclosure relates to a method for measuring a topology of a product surface, wherein the topology of the product surface is detected with a first antenna configuration. Simultaneously, before or after, the fill level is detected with a second antenna configuration. The first antenna configuration is an array antenna with an array of radiator elements arranged around the second antenna configuration.

Another aspect of the present disclosure relates to a program element that, when executed on the processor of a level measurement device, instructs the level measurement device to perform the steps described above and in the following.

Another aspect of the present invention relates to a computer-readable medium on which the program element described above is stored.

The term "process automation in the industrial environment" can be understood as a subfield of technology that includes measures for the operation of machines and plants without the involvement of humans. One goal of process automation is to automate the interaction of individual components of a plant in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as fill level, limit level, flow rate, pressure or density can be monitored and settings for the entire plant can be changed manually or automatically.

A subfield of process automation in the industrial environment concerns logistics automation. In the field of logistics automation, distance and angle sensors are used to automate processes inside or outside a building or within a single logistics facility. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application side. Sensors based on optical measurement methods using lasers, LEDs, 2D cameras or 3D cameras that measure distances according to the time-of-flight (ToF) principle can be used for this purpose.

Another subfield of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

In the following, embodiments of the present disclosure are described with reference to the figures. If the same reference signs are used in the following description of figures, these designate the same or similar elements. The illustrations in the figures are schematic and not to scale.

BRIEF DESCRIPTION OF THE FIGURES

FIG. 4b shows the antenna pattern of the array of FIG. 4a.

FIG. 5b shows the antenna pattern of the array of FIG. 5a.

FIG. 8c shows a perspective view of the antenna system of FIG. 8a.

DETAILED DESCRIPTION OF THE EMBODIMENTS

Figure 1A:
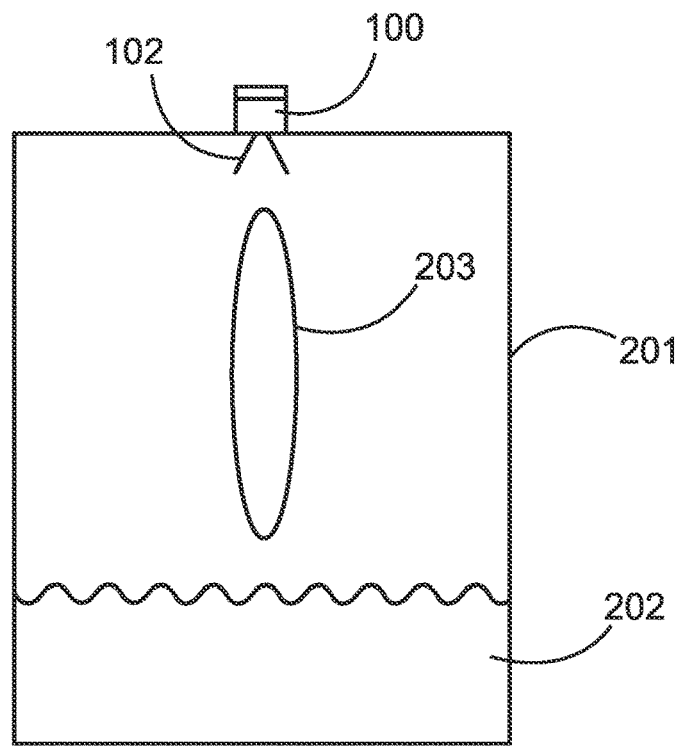
FIG. 1a shows a fill level radar measuring device.

FIG. 1a shows a radar measuring device 100 installed in a container 201. The container contains a product 202 with a somewhat uneven surface. The radar measuring device 100 has an antenna configuration 102 in the form of a horn antenna, which radiates a radar signal in the direction of the product surface. This radar signal may be a pulse-shaped radar signal and is represented by the ellipse 203. The radar signal is then reflected at a product surface and received again by the antenna configuration 102 and evaluated in the measuring device 100 to calculate the fill level.

In fill level radar technology, different types of antennas have proven to be reliable and useful, depending on the location and purpose of use. For example, parabolic mirrors are used for applications where very high directivity is required. These can achieve a very high antenna gain with a relatively small installation depth.

Another very established antenna design is the horn antenna. In addition to a high gain, this very widely used antenna can also be constructed very robustly at low cost. Horn antennas often also contain a lens in the front area, which has various advantages. On the one hand, the horn antenna can be constructed more compactly due to the shortening factor that the electromagnetic wave experiences in the plastic. Furthermore, the lens can create a process seal with respect to the process measuring device (radar measuring device 100). Horn antennas are usually fed by waveguides.

The horn antennas are often round or rotationally symmetrical. Since container openings are very often round in the process industry, rotationally symmetrical antennas can be adapted very well to the containers. Container openings are often also provided with threads into which the antenna can be screwed. Round antennas are also advantageous here. Horn antennas can also be manufactured inexpensively as turned parts.

Figure 1B:
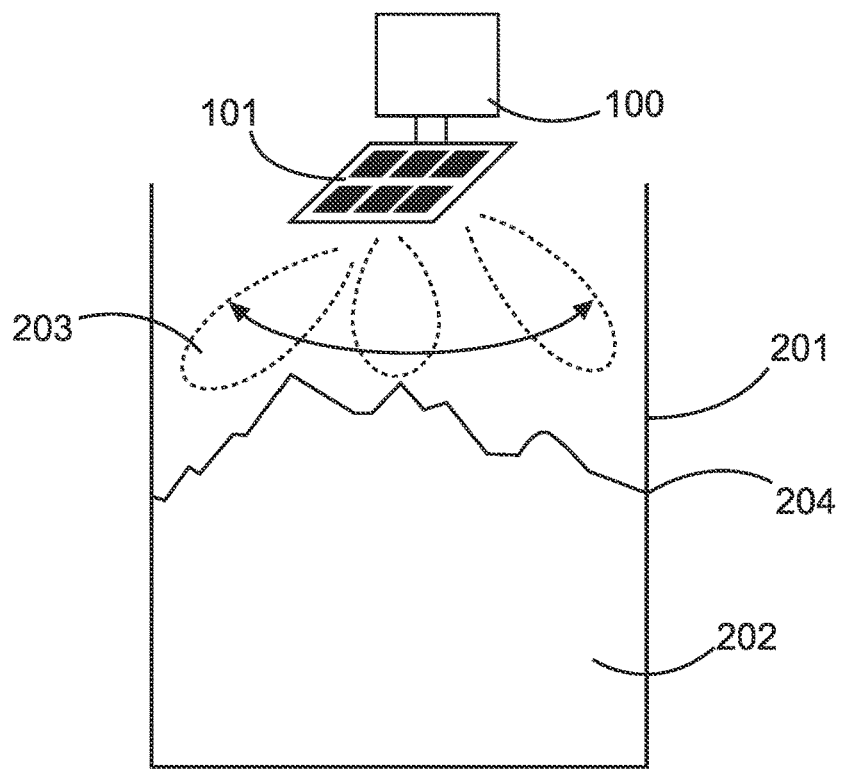
FIG. 1b shows a radar measuring device detecting the topology of a product surface.
Figure 2A:
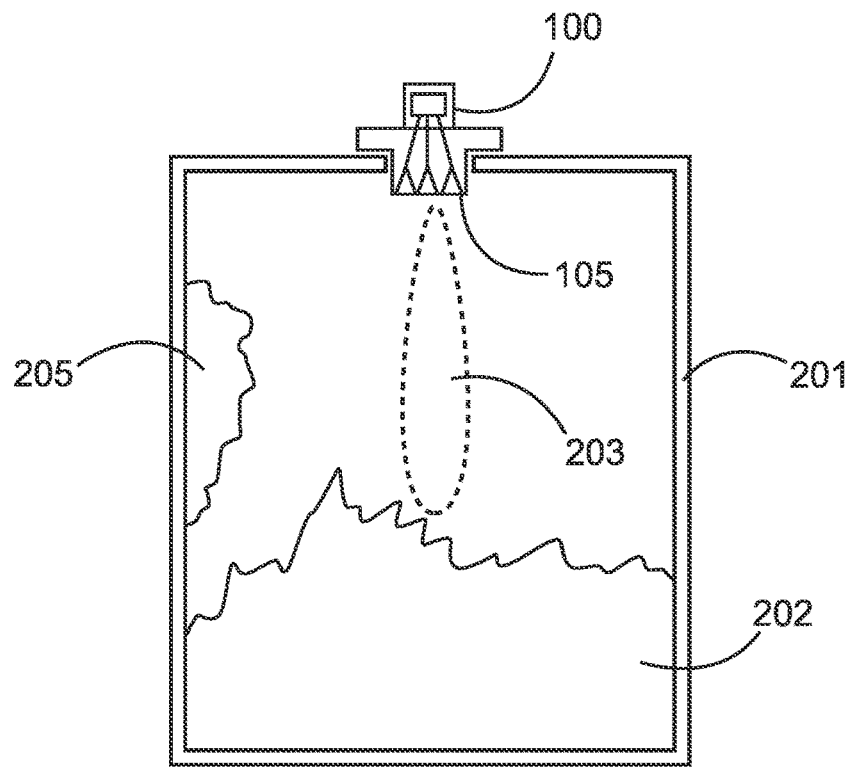
FIG. 2a shows a radar measuring device according to one embodiment.
Figure 2B:
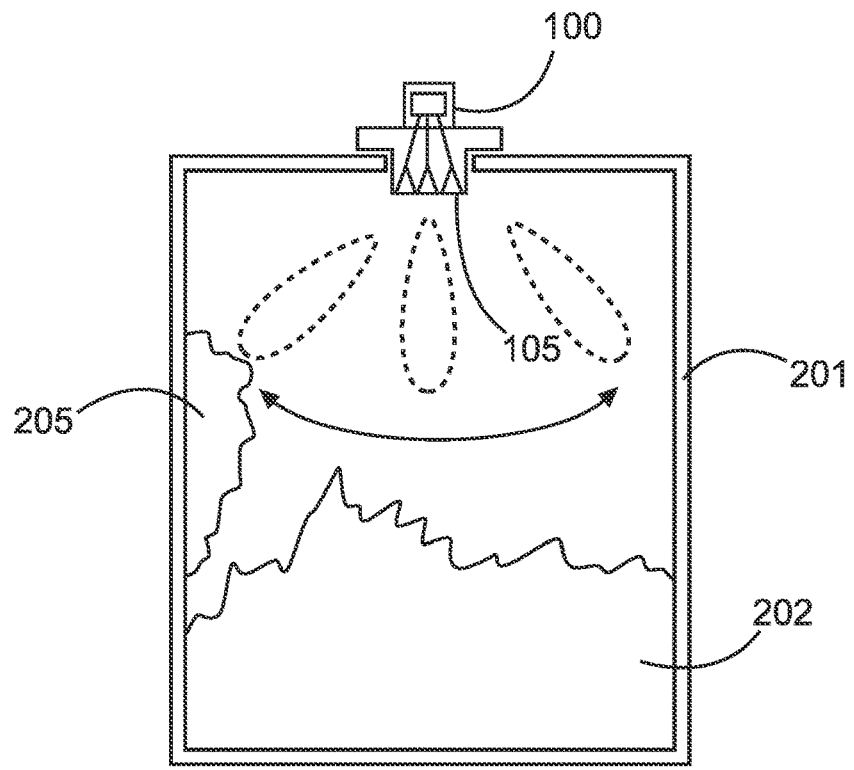
FIG. 2b shows the radar measuring device of FIG. 2a generating different transmission lobes.

FIG. 1b shows a radar level meter 105 detecting the topology of a product surface 204. It is configured to detect the topology of the product surface 204 of the bulk stockpile 202 or to detect buildup 205 (cf. FIG. 2a) on the container wall.

The radar level measuring device 105 shown in FIG. 1b has an antenna configuration 101 which is in the form of an array antenna with an array of radiator elements and with the aid of which electronic beam control can take place in order to scan the product surface and thus detect the topology of the product surface. Reference sign 203 shows the different beam directions.

In addition to systems in which the antenna is mechanically pivoted, systems that can electronically pivot the main beam direction of the antenna can also be used. Also, semi-mechanical systems can be used that pivot one direction of the antenna's main lobe mechanically and the other direction electronically. Antenna systems with electronically pivotable antenna lobes are described below.

Electronically panned antennas are antennas whose main radiation and main reception direction (main lobe) can be pivoted electronically or digitally. They have a large number of transmission and/or reception channels. These radar measuring devices are often referred to as MIMO (multiple input multiple output) radar devices. The various options for changing the main beam and main receive directions on the transmission and reception sides will not be described below.

The positions of the antenna elements play an important role. The antenna elements 103 (see for example FIG. 6) span an antenna array. The antenna elements 103 are often of the same type and are oriented and polarized in the same way with respect to their main radiation direction.

Figure 3A:
FIG. 3a shows a radiator element.
Figure 3B:
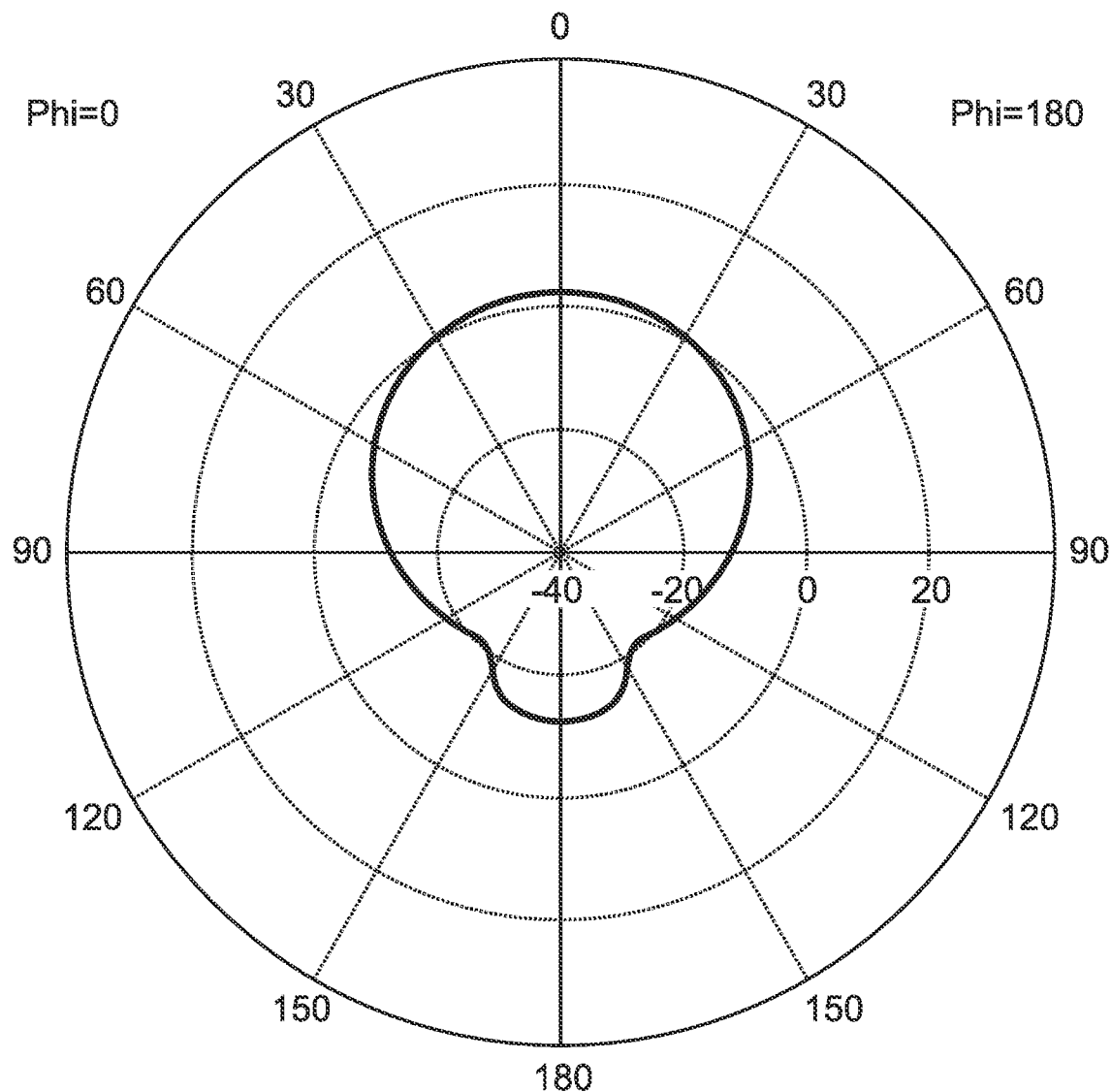
FIG. 3b shows the antenna diagram of a single radiator element.
Figure 4A:
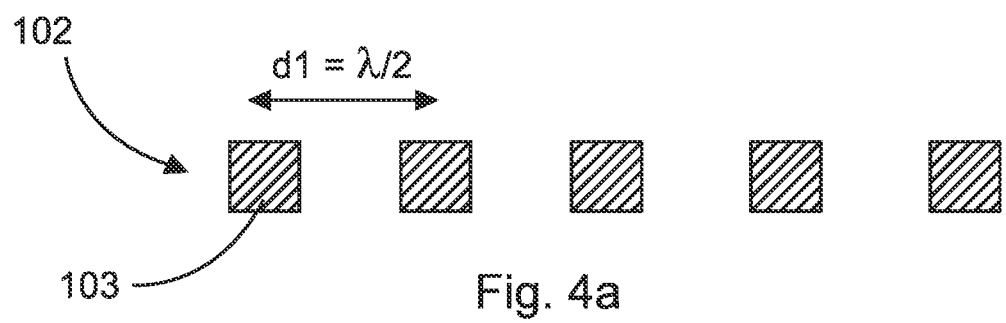
FIG. 4a shows a one-dimensional array of radiator elements.

It is advantageous to have the same distance d1 between more than two antenna elements (see FIG. 4a). If the individual radiator elements 103 now transmit the same signal simultaneously, the result is an overall directional characteristic (see FIG. 4b) which differs from the directional characteristic (see FIG. 3b) of the individual radiator 103 of FIG. 3a.

With correct dimensioning, the overall directional characteristic also has a smaller beam angle in addition to a higher antenna gain. If these transmit signals are now assigned a specified phase shift, it is possible to change the direction of the main radiation pattern (see FIG. 4c). These characteristics typically behave in the same way in the transmission and reception cases.

The antenna spacing of the individual radiators affects the main radiation direction. If the antenna spacing d2 (cf. FIG. 5a) is greater than half the wavelength of the transmitted signal, so-called grating lobes are formed. These grating lobes have almost the same antenna gain as the main lobe, but a different direction. Depending on the application, it is important to avoid such grating lobes, since they create false targets in the radar image.

Figure 5A:
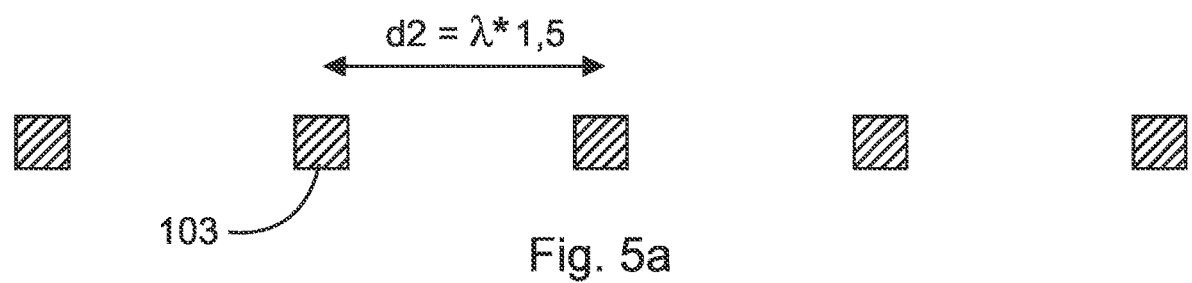
FIG. 5a shows an array of radiator elements with different spacing.
Figure 5B:
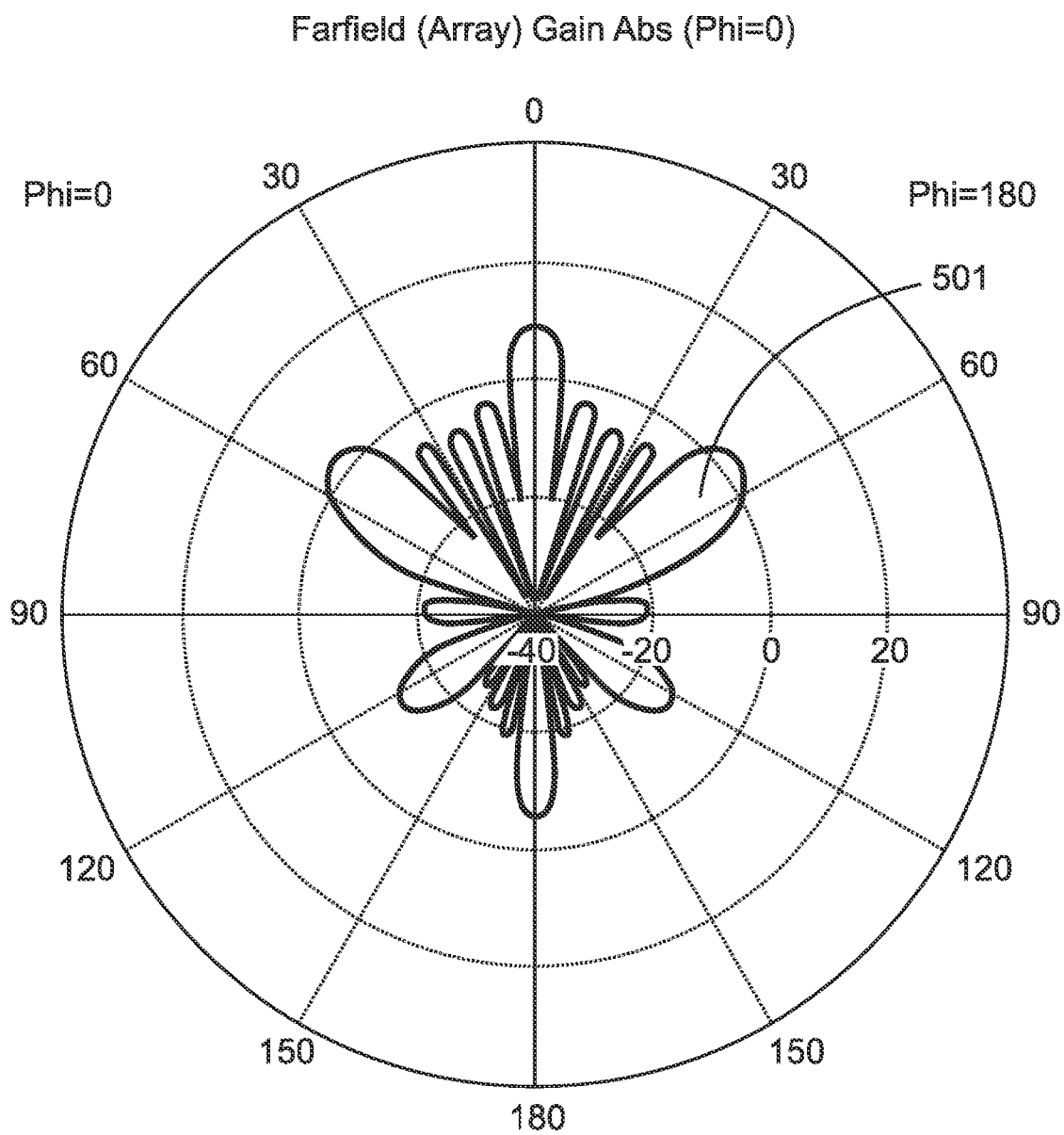

One such grating lobe 501 is shown in FIG. 5b

This can be avoided either by designing the antenna array with an antenna spacing ≤half the wavelength so that no grating lobes are created, or by logically masking out the false targets created by the grating lobes.

Another aspect in the design of an antenna array is the total area covered, which is also known as the antenna aperture and will also be referred to as the radiation area in the following. In general, the larger the aperture, the smaller the antenna aperture angle.

One goal is to achieve an antenna aperture that has a small aperture angle but as few grating and side lobes as possible. This can be achieved with a large number of radar channels, which in turn results in increased costs and energy consumption. At this point, it is necessary to find an optimum.

Figure 4B:
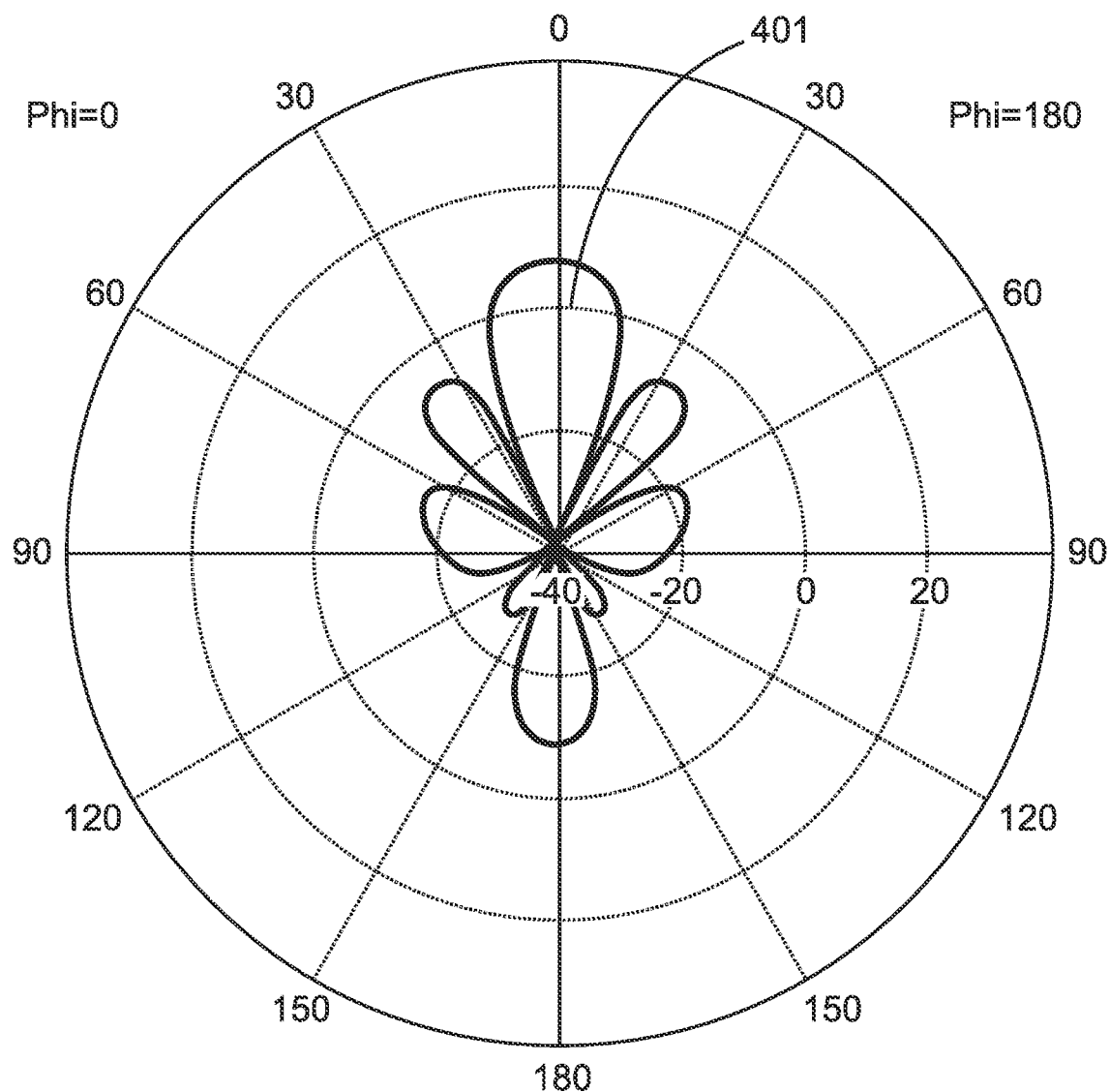
Figure 4C:
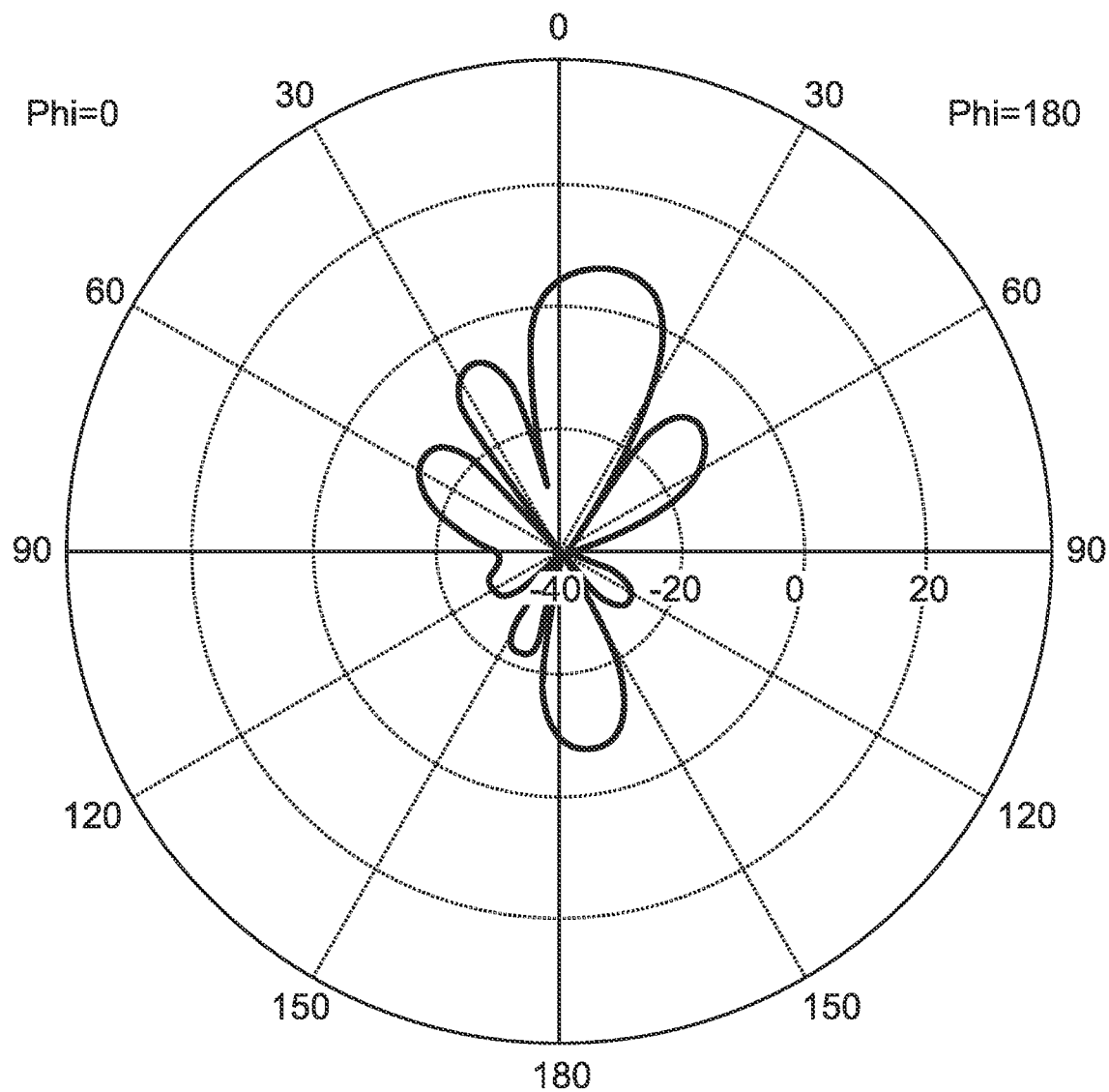
FIG. 4c shows an antenna pattern modified using electronic beam steering.

The antenna diagrams in FIGS. 4b, 4c and 5b each refer to linear antenna arrays, i.e. antenna groups of radiator elements arranged in a line, as shown in FIG. 5a. The respective antenna diagram is thus obtained by plotting the directivity along the longitudinal extent of the array. The main lobe can now be pivoted in this direction.

Figure 6:
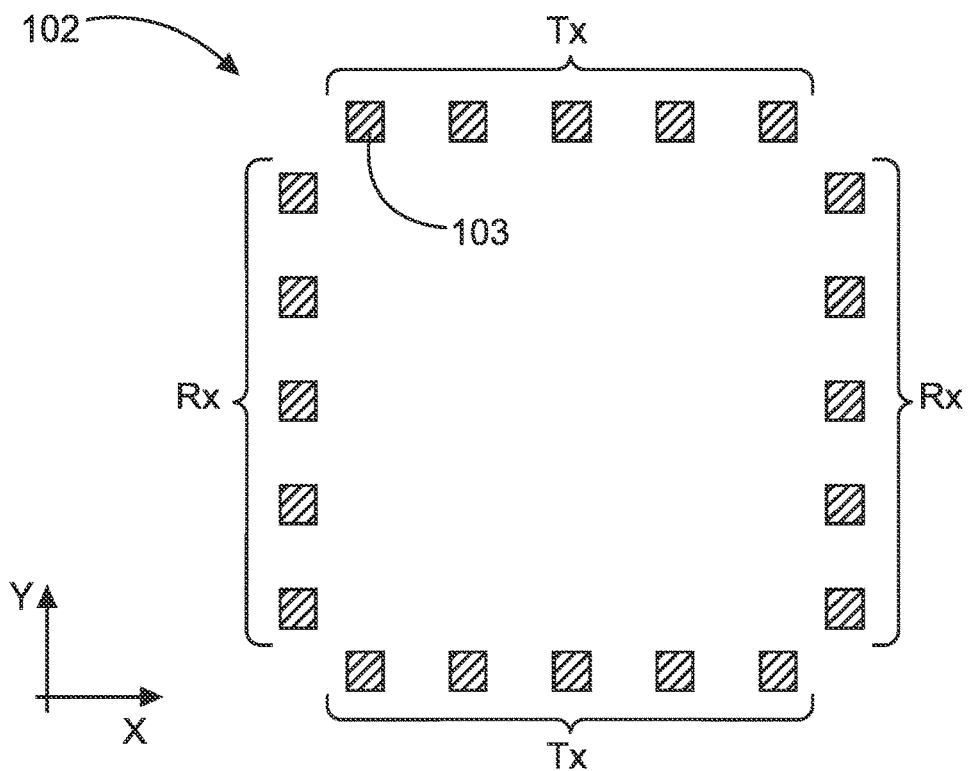
FIG. 6 shows an array antenna according to one embodiment.

If the main radiation direction is now to be pivoted in two spatial directions (dimensions), the array must also be extended in two spatial directions, as can be seen in FIG. 6. This array 102 now consists of four sub-arrays, each with five antenna elements 103, each having a linear extension. The antenna elements 103 may be transmitters and/or receivers.

By appropriately assigning the antenna elements as transmitters and/or receivers and controlling them accordingly, as well as the associated signal processing, transmission-side and reception-side beamforming can be operated with such an array. A possible assignment of the antenna elements 103 in this case would be that the horizontal antenna elements are configured and operated as transmitters and the vertical elements as receivers.

An important aspect regarding energy consumption is the subsequent calculation especially for digital beamforming. Digital beamforming is a way to vary the main receive direction of the receiver array, or to measure the received energy from any direction. This can be done using a fast Fourier transform (FFT). This can be calculated in a particularly energy-saving way in digital arithmetic units in microcontrollers or FPGAs (Field Programmable Gate Array).

It is advantageous if the array to be calculated is linear (see FIGS. 4a, 5a) or rectangular (see FIG. 6) and has constant antenna spacing in the respective spatial direction. In one embodiment, it is also possible that, for example, the antenna spacings in spatial direction x have a different spacing than in spatial direction y. These distances should therefore only be constant in the respective spatial direction.

Only one FFT is needed to calculate one spatial dimension. For other antenna configurations, such as hexagonal arrays, more than one FFT is then required to calculate a spatial dimension, which is detrimental to the energy balance of the overall device because the calculation time is higher when evaluating the measurement data.

The energy balance plays an important role especially for the two-wire interface widely used in process automation in the industrial environment. Here, only a very limited amount of power is available to the measuring device, which can be used for measurement data acquisition and evaluation. Using an appropriately slow measuring cycle, these specified amounts of energy can be utilized for fill level and topology measurement.

Since the topology of a product often changes only slowly, and the formation of buildup is also a slow process, slow measurement cycles can be accepted. In principle, however, level measurements are important for some areas in the process industry with a high measuring cycle (as in relatively fast succession). In order to combine these two measuring techniques in one device, taking into account the limited energy available, a combination of a conventional level measuring device and a topology sensing measuring device is proposed.

Figure 7:
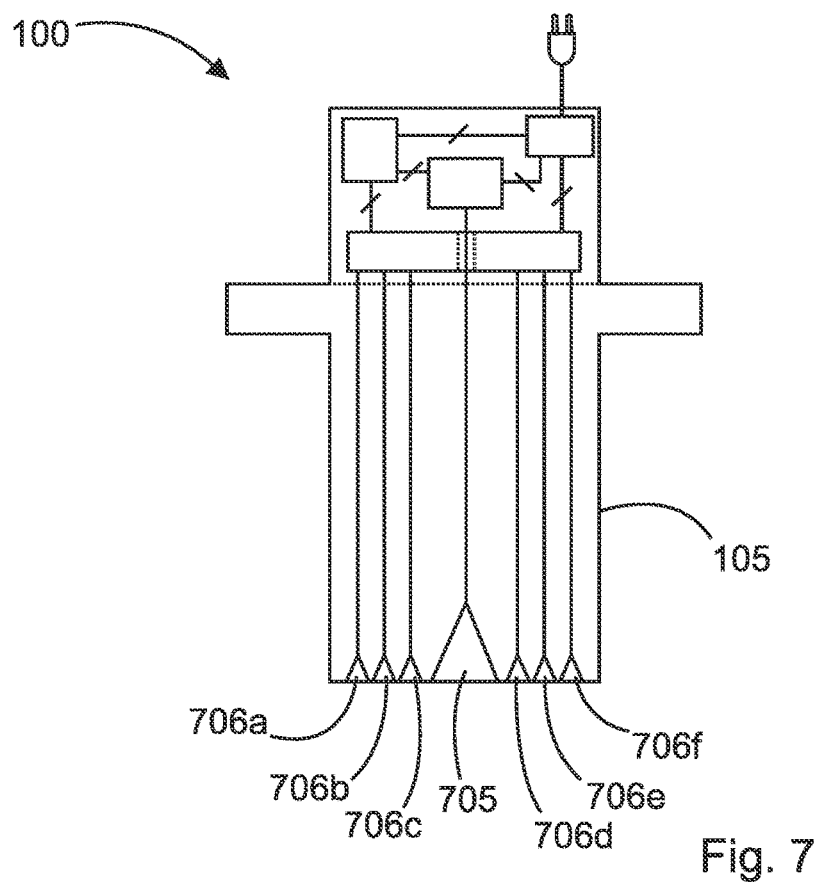
FIG. 7 shows a radar measuring device according to one embodiment.

FIG. 7 illustrates a radar measuring device 100 according to one embodiment of the present disclosure. The radar measuring device 100, which may be a fill level radar measuring device, has an antenna system 105. This antenna system 105 has an antenna configuration 705 for level measurement and a transmit and receive antenna array 706a, 706b, 706c, 706d, 706e, 706f for topology detection.

The antenna configuration 705 for fill level measurement can be designed as a horn antenna with a lens and is arranged in the center of the side of the antenna system facing the process. The antenna gain of the fill level antenna 705 is greater than the antenna gain of a single radiator of the topology sensing array 706a to f.

It is also possible that the fill level antenna 705 is designed for a different frequency range than the antenna array for topology measurement. For example, the antenna array may be designed for a frequency of 80 GHz and the fill level antenna for a frequency of 180 GHz.

The antenna elements 706a to f of the array antenna can be designed, for example, as waveguide apertures, horn radiators, as a waveguide aperture filled with a dielectric, or horn radiators. Patch antennas, rod radiators or other antennas are likewise possible.

Figure 8A:
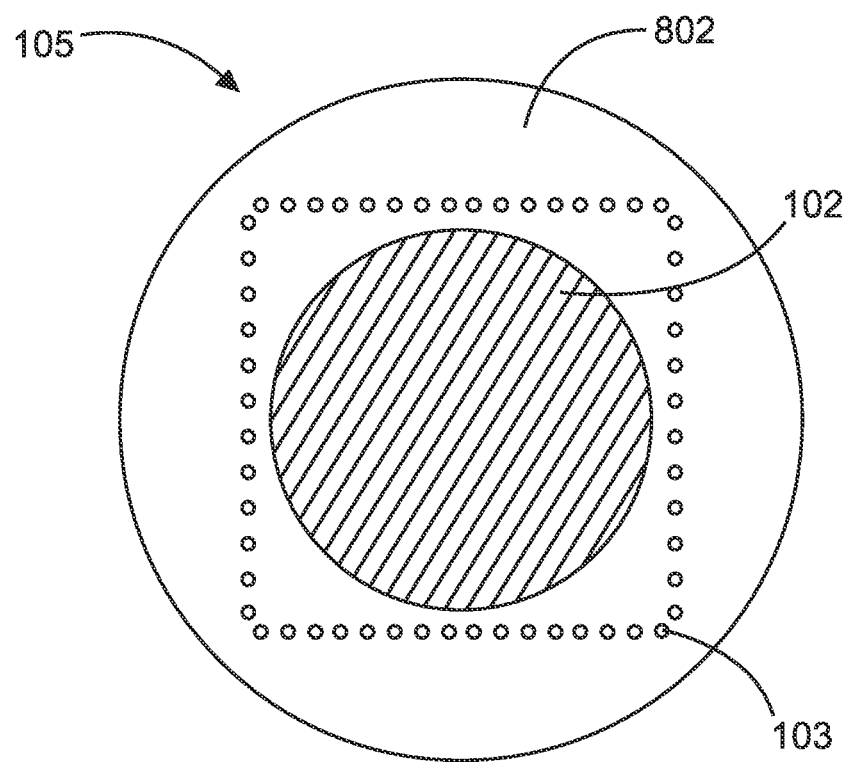
FIG. 8a shows a top view of an antenna system according to one embodiment.
Figure 8B:
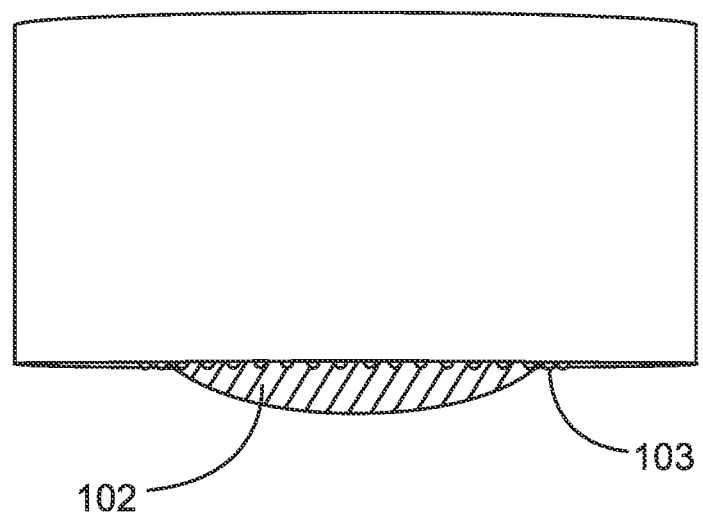
FIG. 8b shows the antenna system of FIG. 8a from the side.
Figure 8C:
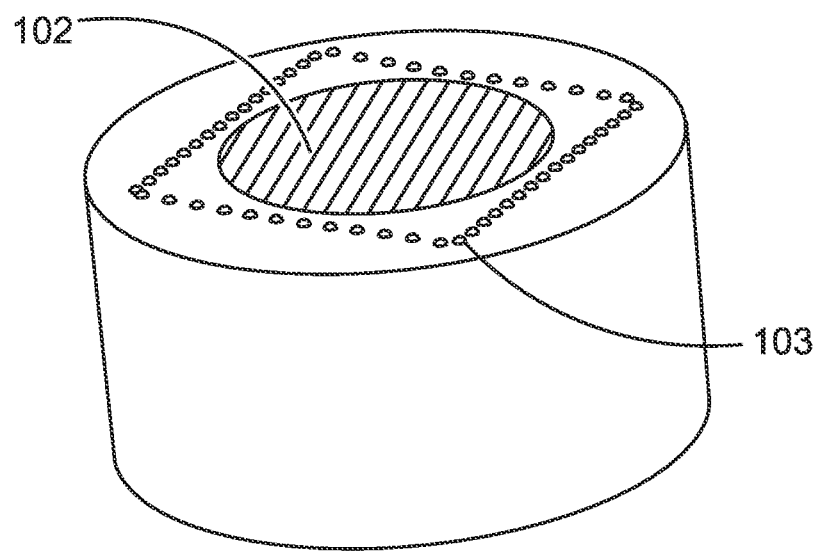

In one embodiment, the openings of the horn array antennas, as well as the opening of the level horn antenna, are recessed on one level in a metallic plate 802 (see FIGS. 8a, 8b and 8c). This metallic plate 802 is, for example, round and fits through a DN 100 or DN 80 process connection. Thus, the antenna system has a smaller diameter than the opening of the process container. Thus, the entire antenna can be passed through this process connection into the container.

Furthermore, the arrangement of the antennas 706a to f of the array with the fill level antenna 705 is relevant. For example, the transmission and reception arrays of the topology-detecting antenna configuration each have a linear configuration. In this regard, the transmission antenna array may comprise one or more lines. Similarly, the reception antenna array may comprise one or more columns. In this embodiment, the transmission and reception rows are orthogonal to each other.

In an embodiment, the fill level horn antenna 102 sits in the center of the antenna system 105 and is surrounded by transmission and reception line antennas of the topology sensing antenna configuration 101. The rectangular antenna array configuration of the topology sensing array antenna allows energy efficient beamforming algorithms to be applied. Likewise, the fill level antenna can then be made as large as possible.

Figure 9:
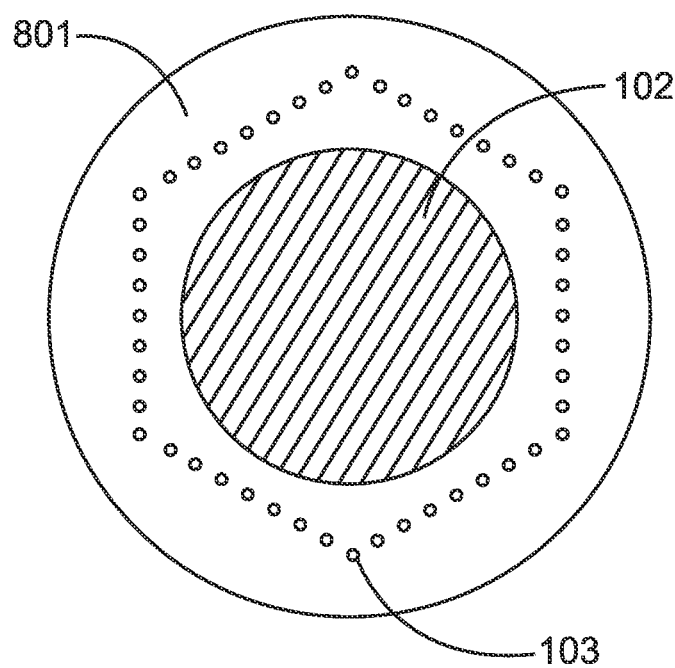
FIG. 9 shows an antenna system with a different arrangement of radiator elements.

According to another embodiment, the antennas 103 of the array are arranged in a hexagon (cf. FIG. 9). This has the consequence that the available space can be better utilized by the array. Likewise, the fill level antenna can be made larger.

According to a further embodiment, the number of transmission antenna elements is not equal to the number of reception antenna elements.

According to a further embodiment, the antenna system 105 has one or more anti-attachment devices. Here, for example, a radome, purge air or a bag or cover made of flexible PTFE material may be mentioned.

According to a further embodiment, the fill level measurement and the topology sensing measurement make use of different measurement principles, in particular different radar measurement principles. For example, the fill level measurement can be carried out as a pulse radar method and the topology-detecting measurement as an FMCW method.

Furthermore, the polarization of the fill level antenna can be different with respect to the array antennas to suppress interfering reflections.

Likewise, the measurements can run in parallel or sequentially. Advantageously, in the case of a simultaneous measurement, the radar methods or frequencies are selected so that the two measurements do not interfere with each other.

It is also possible for the fill level measurement to be based on a different measurement principle, such as ultrasonic-based or optical fill level measurement.

According to another embodiment, the fill level antenna is designed as a rectangular horn antenna. In combination with a rectangular antenna array, the rectangular horn antenna allows optimum use of the area within the antenna array and maximum gain.

The antenna system comprises a single fill level antenna and an independent antenna array for topology detection. The diameter of the antenna system is usually smaller than the vessel opening. The fill level antenna is surrounded by the antenna array. For example, the linear sub-arrays may have same orientation with respect to each other. For example, the linear sub-arrays may have the same orientation, as shown in FIG. 6. The Tx transmit antennas are oriented in the x-direction, Rx receive antennas are oriented in the y-direction.

The subarrays can also be aligned identically to the fill level antenna. Different frequency ranges can be used for the fill level antenna and the array antenna. A common attachment avoidance device may be provided. In particular, different radar methods can be used for the fill level measurement and the topology measurement. Also, different polarizations of the fill level antenna and the array antenna can be applied.

Figure 10:
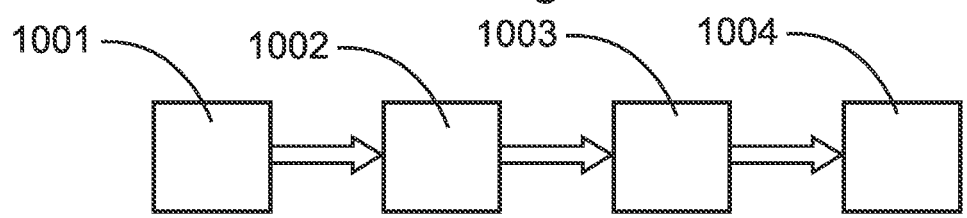
FIG. 10 shows a flow diagram of a method according to one embodiment.

FIG. 10 shows a flow diagram of a method according to an embodiment. In step 1001, the topology of the product surface is detected with a first antenna configuration. In step 1002, the fill level is detected with a second antenna configuration. In step 1003, both measurements are used in calculating the volume of the fill material and the fill level or volume is output in step 1004. It should be noted here that the two measurement methods can also act independently of each other. The fill level can be measured independently of the topology. The fill level measurement can have a higher measurement rate than the topology measurement. The topology measurement can be performed independently of the fill level measurement. The measurement data from the fill level measurement can be used to increase measurement reliability and to check the plausibility of the measurement data from the topology measurement, but this is by no means a must.

Additionally, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. An antenna system configured for a radar measuring device detecting a topology of a product surface, comprising:
    a first antenna configuration configured to detect the topology of the product surface; and
    a second antenna configuration configured to detect a fill level,
    wherein the first antenna configuration is an array antenna having an array of radiator elements arranged around the second antenna configuration,
    wherein radiating surfaces of the radiator elements of the first antenna configuration and radiating surface of the second antenna configuration are arranged on the same plane.

2. The antenna system according to claim 1,
    wherein the second antenna configuration is a horn antenna.

3. The antenna system according to claim 1,
    wherein the radiator elements of the first antenna configuration are horn antennas or waveguide apertures which are filled with a dielectric material.

4. The antenna system according to claim 1,
    wherein a diameter or edge length of the radiator elements of the first antenna configuration is smaller than the diameter or edge length of the second antenna configuration.

5. The antenna system according to claim 1,
    wherein the radiating surfaces of the radiator elements of the first antenna configuration and the radiating surface of the second antenna configuration are arranged in a form of filled or unfilled holes in a metallic plate.

6. The antenna system according to claim 5,
    wherein the metallic plate is round.

7. The antenna system according to claim 1, wherein the radiator elements of the first antenna configuration form a rectangle or a hexagon.

8. The antenna system according to claim 1, wherein the radiator elements of the first antenna configuration include a group of transmitting elements and a group of receiving elements.

9. A radar measuring device comprising the antenna system according to claim 1.

10. The radar measuring device of claim 9, wherein the device is configured to transmit an FMCW radar signal with the first antenna configuration and a pulse signal with the second antenna configuration.

11. The radar measuring device of claim 10, wherein the pulse signal is a radar signal or an ultrasonic signal.

12. The radar measuring device of claim 9, wherein an overall diameter of the antenna system is smaller than a diameter of a container opening through which the radar measuring device is inserted and/or to which the radar measuring device is attached.

13. The antenna system according to claim 2, wherein the radiator elements of the first antenna configuration are horn antennas or waveguide apertures which are filled with a dielectric material.

14. The antenna system according to claim 2, wherein a diameter or edge length of the radiator elements of the first antenna configuration is smaller than the diameter or edge length of the second antenna configuration.

15. The antenna system according to claim 3, wherein a diameter or edge length of the radiator elements of the first antenna configuration is smaller than the diameter or edge length of the second antenna configuration.

16. A method for measuring a topology of a product surface, comprising:
    detecting the topology of the product surface with a first antenna configuration; and
    detecting a fill level with a second antenna configuration,
    wherein the first antenna configuration is an array antenna having an array of radiator elements arranged around the second antenna configuration,
    wherein radiating surfaces of the radiator elements of the first antenna configuration and radiating surface of the second antenna configuration are arranged on the same plane.

17. A non-transitory computer readable medium having stored thereon a program element which, when executed on a processor of a level meter, directs the processor of the level meter to implement a method for measuring a topology of a product surface, comprising:
    detecting the topology of the product surface with a first antenna configuration; and
    detecting a fill level with a second antenna configuration,
    wherein the first antenna configuration is an array antenna having an array of radiator elements arranged around the second antenna configuration,
    wherein radiating surfaces of the radiator elements of the first antenna configuration and radiating surface of the second antenna configuration are arranged on the same plane.

* * * * *